(12) United States Patent
Spooner et al.

(10) Patent No.: US 9,732,850 B2
(45) Date of Patent: Aug. 15, 2017

(54) PARK RELEASE METHOD AND VEHICLE HAVING PARK RELEASE MEANS

(71) Applicant: Jaguar Land Rover Limited

(72) Inventors: John Spooner, Kenilworth (GB); Graham Tarver, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/385,107

(22) PCT Filed: Mar. 11, 2013

(86) PCT No.: PCT/EP2013/054889
§ 371 (c)(1),
(2) Date: Sep. 12, 2014

(87) PCT Pub. No.: WO2013/135635
PCT Pub. Date: Sep. 19, 2013

(65) Prior Publication Data
US 2015/0034450 A1 Feb. 5, 2015

(30) Foreign Application Priority Data

Mar. 12, 2012 (GB) .................................. 1204325.3

(51) Int. Cl.
*F16H 61/22* (2006.01)
*F16H 63/34* (2006.01)

(52) U.S. Cl.
CPC ..... *F16H 63/3491* (2013.01); *F16H 63/3458* (2013.01); *F16H 63/3416* (2013.01)

(58) Field of Classification Search
CPC ............. F16H 63/3491; F16H 63/3425; F16H 63/3433; F16H 63/3458
(Continued)

(56) References Cited

U.S. PATENT DOCUMENTS 6,179,108 B1  1/2001  Gierer et al.
8,327,732 B2  12/2012 Giefer
(Continued)

FOREIGN PATENT DOCUMENTS

DE   102008043249   1/2010
DE   102010008747   8/2011
(Continued)

OTHER PUBLICATIONS

Definition: handle ; Merriam Webster's Collegiate Dictionary, Tenth Edition.*
(Continued)

*Primary Examiner* — Robert A Siconolfi
*Assistant Examiner* — Ryan Dodd
(74) *Attorney, Agent, or Firm* — Reising Ethington P.C.

(57) ABSTRACT

In one aspect of the invention there is provided a method of manually releasing power actuated vehicle park means in the absence of power, the method comprising the steps of: rotating a power actuated selector shaft from a park mode position in which one or more wheels are locked by the park means to a park release mode position in which the one or more wheels are released by the park means; and locking the selector shaft in the release mode position by means of locking means, whereby the successive steps of rotating the selector shaft to the release mode position and subsequently locking the selector shaft in the release mode position comprise manual translation or rotation of one or more members in first and second directions respectively, the first direction being different from the second direction.

5 Claims, 5 Drawing Sheets

(58) Field of Classification Search
USPC .................................................. 192/219.6
See application file for complete search history.

(56) References Cited

U.S. PATENT DOCUMENTS

| | | | |
|---|---|---|---|
| 2003/0019713 A1 | 1/2003 | Gudlin | |
| 2005/0082126 A1 | 4/2005 | Engle et al. | |
| 2007/0209903 A1* | 9/2007 | Hayashi | B60T 7/104 |
| | | | 192/219.6 |
| 2008/0264190 A1* | 10/2008 | Nishimura | F16H 61/22 |
| | | | 74/335 |
| 2008/0277236 A1 | 11/2008 | Ruhringer | |
| 2009/0038430 A1* | 2/2009 | Itazu | F16H 63/3458 |
| | | | 74/503 |
| 2011/0030494 A1* | 2/2011 | Ruhl | F16H 63/3491 |
| | | | 74/473.23 |
| 2011/0137533 A1 | 6/2011 | Park | |
| 2011/0308346 A1* | 12/2011 | Yamamura | B60K 20/04 |
| | | | 74/473.23 |
| 2013/0020171 A1* | 1/2013 | Jang | B60T 1/005 |
| | | | 192/220.2 |
| 2014/0182408 A1* | 7/2014 | Galden | F16H 61/22 |
| | | | 74/473.21 |
| 2014/0318297 A1 | 10/2014 | Scheiblecker et al. | |
| 2015/0308571 A1* | 10/2015 | Wyatt | F16H 63/3491 |
| | | | 192/219.5 |

FOREIGN PATENT DOCUMENTS

| | | |
|---|---|---|
| JP | H05288266 | 11/1993 |
| JP | H11325243 A | 11/1999 |
| JP | 2008503695 A | 2/2008 |
| JP | 2010520423 A | 6/2010 |
| WO | 2013079182 A1 | 6/2013 |

OTHER PUBLICATIONS

Search Report Corresponding to application No. GB1304328.6, dated Mar. 12, 2014, 2 pages.
Japanese Office Action in Japanese with English translation for Application No. 2014561401, dated Nov. 1, 2016, 10 pages.
International Search Report for application No. PCT/EP2013/054889, dated Jul. 11, 2013, 5 pages.
Great Britain Combined Search and Examination Report for application No. GB1204325.3, dated Jun. 12, 2012, 8 pages.
Written Opinion for application No. PCT/EP2013/054889, dated Jul. 11, 2013, 9 pages.
Japanese Office Action in Japanese with English translation for JP application No. 2014-561401, dated Jun. 9, 2017, 10 pages.

* cited by examiner

PARK RELEASE METHOD AND VEHICLE HAVING PARK RELEASE MEANS

FIELD OF THE INVENTION

The present invention relates to a park lock release arrangement and a method of releasing a park lock.

BACKGROUND

Known shift-by-wire automatic transmissions generally assume a park mode by default in the event of an electrical power failure such as a flat battery or other fault, for example due to a collision. Recovery of the vehicle can therefore be difficult due to locking of the wheels of the vehicle by the transmission.

When the transmission is in the park mode one or more wheels of the vehicle may be locked by the transmission. If the park mode is deselected the one or more wheels are released, allowing the one or more wheels to freely rotate. The state of the transmission may be controlled by means of a rotatable selector shaft, different transmission modes corresponding to different respective rotational positions of the selector shaft.

In some known arrangements a latching release lever is provided behind a dashboard trim panel in a cabin of the vehicle. The release lever is coupled by means of a Bowden cable arrangement to a selector shaft lever that is fixed to the selector shaft. The transmission may be released from the park mode by rotating the latching release lever through a required angle to a latch position, in which the lever remains until it is unlatched. As the lever is rotated, the Bowden cable causes the selector shaft lever to rotate from a transmission park mode position to a transmission park released state position, thereby releasing the transmission from the park mode.

It is to be understood that the transmission selector shaft is typically spring loaded such that if the shaft is released the shaft rotates automatically under the bias of a spring member of the transmission to the park mode position.

In another known arrangement a threaded bracket is mounted adjacent the selector shaft lever at a location such that it does not interfere with required movement of the selector shaft lever in normal operation. When it is required to release the transmission from the park state, a bolt is screwed through the bracket until it abuts the lever. Continued rotation of the bolt causes deflection of the selector shaft lever. The bolt may be screwed through the bracket until the selector shaft lever has been rotated to the park release position.

A disadvantage of this arrangement is that a person manipulating the bolt is required to crawl underneath a vehicle to be moved in order to access the bolt. If the vehicle moves unexpectedly when the bolt is manipulated, the person under the vehicle may be injured. Furthermore, to arrest movement of the vehicle the person manipulating the bolt must unscrew the bolt quickly to allow the transmission to resume the park mode. In practical situations there may not be sufficient time to unscrew the bolt before injury occurs.

It is also known to provide a vehicle having an electric park brake. The park brake is deployed or released by rotation of a shaft such as a selector shaft or actuation shaft by means of an electric motor or hydraulic fluid pressure under the control of an electrical controller. If a vehicle suffers electrical failure when the park brake is deployed the vehicle may become immobilised due to inability to rotate the shaft. In embodiments having a shaft actuated by hydraulic fluid pressure the vehicle may become immobilised if either electrical power or hydraulic fluid pressure is not available.

It is against this background that the present invention has been conceived. Embodiments of the invention may provide an arrangement or a method which addresses one or more of the above problems. Other aims and advantages of the invention will become apparent from the following description, claims and drawings.

STATEMENT OF THE INVENTION

Aspects of the invention provide a method and a vehicle as claimed in the appended claims.

According to another aspect of the invention for which protection is sought there is provided a method of manually releasing power actuated vehicle park means in the absence of power, the method comprising the successive steps of:

rotating a power actuated selector shaft from a park mode position in which one or more wheels are locked by the park means to a park release mode position in which the one or more wheels are released by the park means by rotating a handle means coupled to the selector shaft to a release mode position of the handle means; and locking the selector shaft in the release mode position by pinning the shaft in the release mode position by means of a locking pin member.

According to a further aspect of the invention for which protection is sought there is provided a method of manually releasing power actuated vehicle park means in the absence of power, the method comprising the successive steps of:

rotating a power actuated selector shaft from a park mode position in which one or more wheels are locked by the park means to a park release mode position in which the one or more wheels are released by the park means by rotating a handle means coupled to the selector shaft to a release mode position of the handle means; and locking the selector shaft in the release mode position by translating at least a portion of the handle means thereby to lock the selector shaft in the release mode position.

According to a still further aspect of the invention for which protection is sought there is provided a method of manually releasing power actuated vehicle park means in the absence of power, the method comprising the successive steps of:

rotating a power actuated selector shaft from a park mode position in which one or more wheels are locked by the park means to a park release mode position in which the one or more wheels are released by the park means; and locking the selector shaft in the release mode position by means of a hook member.

Embodiments of the inventions which comprise one or more these aspects are contemplated.

The locking pin member may be an elongate member. Alternatively, the locking pin member may be any suitable shape. The locking pin member may comprise a hex key such as an Allen® key It may be that the successive steps of rotating the selector shaft to the release mode position and subsequently locking the selector shaft in the release mode position comprise manual translation or rotation of one or more members in first and second directions respectively, the first direction being different from the second direction.

Thus, the step of rotating the selector shaft to the release mode position requires translation or rotation of one or more members in the first direction and the step of locking the selector shaft comprises translation or rotation of one or more members in the second direction which is different from the first direction.

It is to be understood that by the term 'power failure' is meant failure of a power source normally used to actuate the selector shaft. This failure may be a loss of voltage in the case of an electrically actuated shaft, or a loss of fluid pressure in the case of a hydraulically or pneumatically actuated mechanism.

Embodiments of the present invention have the advantage that the shaft may be rotated from the park mode position to the park release mode position without locking the shaft in the park release mode position. A risk that a user unintentionally locks the shaft in the park release mode position is low because a member must be moved in a different direction in order to lock the shaft compared with that in which a member is moved in order to release the shaft. (In some embodiments a single member may be is moved in order to release and subsequently lock the shaft; in some embodiments different respective members are moved in order to release and subsequently lock the shaft).

If after the selector shaft has been rotated to the release mode position the vehicle moves in an undesirable manner, for example due to the vehicle being on an incline, and it is desired to arrest movement of the vehicle, the shaft may be moved back to the park mode position without a requirement to first unlock or release the locking means. That is, if the vehicle moves before the shaft is locked by the locking means the shaft may be moved back to the park mode position to arrest movement of the vehicle.

In some embodiments the selector shaft may be arranged automatically to move back to the park mode position upon under the bias of biasing means such as a spring element. Thus if, after rotating the selector shaft to the park release mode position, a user releases the selector shaft before locking the selector shaft in the park release mode position, the selector shaft returns to the park mode position under the bias of the biasing means.

This feature has the advantage over some known arrangements that a risk that a person releasing the park means is inconvenienced by inadvertent and excessive movement of the vehicle is reduced. The park means may for example be an automatic transmission having a park mode, and the shaft may be a transmission mode selector shaft.

Alternatively the park means may be an electric parking brake where the shaft is a park mode selector shaft. The park mode position may correspond to a park brake-on position of the shaft and the park release mode position may correspond to a park brake-off position of the shaft.

The feature that the shaft may be locked in the park release mode position has the advantage that a person releasing the transmission or parking brake is not required manually to maintain the shaft in the park release mode position whilst the vehicle is moved.

Rather, once the selector shaft has been rotated the person may determine that it is safe to lock the shaft in the release mode position, lock the shaft in the release mode position, and subsequently move the vehicle without manually holding the shaft in the release mode position.

Optionally the steps of rotating the selector shaft to the release mode position and subsequently locking the selector shaft in the release mode position require translation or rotation of the one or more members in substantially orthogonal first and second directions.

Advantageously the step of rotating the selector shaft to the release mode position may comprise rotating handle means coupled to the selector shaft to a release mode position of the handle means.

Optionally the step of locking the selector shaft comprises the step of translating at least a portion of the handle means thereby to lock the selector shaft in the release mode position.

Optionally the step of locking the selector shaft comprises locking the handle in a position by means of a latch arrangement.

The latch arrangement may comprise a detent arrangement.

The handle means may comprise a bi-stable longitudinal member operable to assume first and second shape forms, the method comprising rotating the handle means with the member in the first shape form about the selector shaft axis thereby to rotate the selector shaft from the park mode position to the park release mode position and subsequently causing the member to assume the second shape form such that the selector shaft is prevented from rotating back to the park mode position by interference of the handle means with one or more components.

Advantageously the step of causing the member to assume the second shape form may comprise causing a portion of the handle means to penetrate a recess formed in a portion of a component, optionally a component of the park means. Optionally, the handle comprises an aperture or recess arranged to align with and engage a correspondingly shaped protrusion formed in the component, optionally a component of the park means, when the handle is in the park release mode.

The step of locking the selector shaft in the release mode position by locking means may comprise locking the shaft in the release mode position by means of a hook member.

Optionally one portion of the hook member is coupled to the handle means, the step of locking the selector shaft in the release mode position comprising hooking another portion of the hook member to an anchor point, the anchor point being provided in a substantially fixed position with respect to an axis of rotation of the selector shaft.

The anchor point may comprise an aperture, the method comprising inserting a locking pin member into the aperture and hooking the hook member to the locking pin member.

Alternatively a first portion of the hook member may be coupled to an anchor point that is provided in a substantially fixed position with respect to an axis of rotation of the shaft and the step of locking the selector shaft in the release mode position may comprise hooking a second portion of the hook member to the handle means.

Optionally the step of locking the selector shaft in the release mode position comprises pinning the shaft in the release mode position by means of a locking pin member.

Optionally the step of locking the selector shaft in the release mode position comprises inserting the locking pin member through an aperture in the handle means and pinning the locking pin member in an aperture that is substantially fixed with respect to an axis of rotation of the selector shaft.

The step of pinning the locking pin member in the aperture may comprise locking the locking pin member in the aperture by means of retention means thereof thereby to prevent removal of the locking pin member unless the locking pin member is first unlocked.

This feature has the advantage that a risk of inadvertent removal of the locking pin member may be reduced.

The step of locking the locking pin member in the aperture may comprise the step of inserting a substantially T-shaped retention portion of the locking pin member into the aperture and twisting the locking pin member.

This feature has the advantage that a relatively simple locking mechanism may be provided.

It is to be understood that any suitably shaped feature including but not limited to a substantially 'T'-shaped feature may be arranged selectively to cooperate with a slot that is substantially fixed with respect to the selector shaft when the handle means is in the release mode position, thereby to lock the handle means in the release mode position.

Advantageously the method may comprise rotating the selector shaft to the park release mode position by means of a Bowden cable arrangement.

The method may be a method of releasing an automatic transmission from a park mode.

Alternatively the method may be a method of releasing an electric parking brake from a brake-on mode.

In one aspect of the invention for which protection is sought there is provided a vehicle comprising:
  power actuated park means operable to lock one or more wheels of the vehicle in a substantially stationary condition, the park means comprising a power actuated selector shaft for selecting an operational mode of the park means, the selector shaft being rotatable between a park mode position in which the one or more wheels are locked by the park means and a park release mode position in which the one or more wheels are released by the park means;
  locking means for locking the selector shaft in the park release mode position, the locking means comprising a locking pin member operable to pin the selector shaft in the release mode position; and
  handle means coupled to the selector shaft, the handle means being operable to rotate the shaft to the release mode position by rotation thereof,
  the park means being operable whereby the selector shaft may be rotated to the park release mode position and locked by the locking means in the park release mode position.

In a further aspect of the invention for which protection is sought there is provided a vehicle comprising:
  power actuated park means operable to lock one or more wheels of the vehicle in a substantially stationary condition, the park means comprising a power actuated selector shaft for selecting an operational mode of the park means, the selector shaft being rotatable between a park mode position in which the one or more wheels are locked by the park means and a park release mode position in which the one or more wheels are released by the park means;
  locking means for locking the selector shaft in the park release mode position; and
  handle means coupled to the selector shaft, the handle means being operable to rotate the shaft to the release mode position by rotation thereof,
  the park means being operable whereby the selector shaft may be rotated to the park release mode position and locked by the locking means in the park release mode position by translating at least a portion of the handle means.

In a still further aspect of the invention for which protection is sought there is provided a vehicle comprising:
  power actuated park means operable to lock one or more wheels of the vehicle in a substantially stationary condition, the park means comprising a power actuated selector shaft for selecting an operational mode of the park means, the selector shaft being rotatable between a park mode position in which the one or more wheels are locked by the park means and a park release mode position in which the one or more wheels are released by the park means; and
  locking means for locking the selector shaft in the park release mode position, the locking means comprising a hook member; and
  the park means being operable whereby the selector shaft may be rotated to the park release mode position and locked by the locking means in the park release mode position.

Embodiments of the invention which comprise two or more of these aspects are contemplated It may be that the park means is operable whereby the selector shaft may be rotated manually to the park release mode position and locked manually by the locking means in the park release mode position by manual translation or rotation of one or more members in first and second directions respectively in the absence of power, the first direction being different from the second direction.

The vehicle may be operable to release the park means and lock the selector shaft in the release mode position by translation or rotation of the one or more members in substantially orthogonal first and second directions.

The vehicle may comprise handle means coupled to the selector shaft, the handle means being operable to rotate the shaft to the release position by rotation thereof.

The vehicle may be operable to lock the selector shaft in the release mode position by translating at least a portion of the handle means.

The vehicle may comprise a latch arrangement for locking the selector shaft in the release mode position.

Optionally the handle means comprises a bi-stable longitudinal member operable to assume first and second shape forms, the selector shaft being rotatable from the park mode position to the park release mode position by rotation of the handle means from a corresponding park mode position to a corresponding park release mode position whilst the handle means is in the first shape form, with the selector shaft in the park release mode position the handle means being operable to assume the second shape form, with the selector shaft in the park release mode position and the handle means in the second shape form, the handle means being prevented from rotating back to the park mode position by interference with one or more components of the vehicle.

Further optionally the vehicle is arranged wherein with the handle means in the park release mode position thereof and in the second shape form a portion of the handle means penetrates a recess defined by one or more components of the vehicle thereby to prevent rotation of the handle means back to the park position thereof.

The locking means may comprise a hook member.

Optionally the hook member is coupled to the handle means, the hook member being operable to hook to an anchor point being a point substantially fixed with respect to an axis of rotation of the selector shaft thereby to lock the selector shaft in the park release mode position.

Further optionally the anchor point comprises an aperture arranged to receive a locking pin member to which the hook member may be hooked.

Alternatively the hook member may be coupled to an anchor point that is substantially fixed with respect to the axis of rotation of the selector shaft, the hook member being operable to be hooked to the handle means thereby to constrain movement of the handle means and maintain the selector shaft in the release mode position.

Advantageously the locking means may comprise a locking pin member operable to pin the transmission selector shaft in the release mode position.

The handle member may be operable to be locked in the park release mode position by insertion of the locking pin member through an aperture formed in a portion of the handle member.

Optionally the locking pin member comprises retention means by means of which the locking pin member may be locked in the aperture thereby to prevent removal of the locking pin member unless the locking pin member is first unlocked.

The retention means may be provided in the form of a substantially T-shaped portion of the locking pin member, the locking pin member and aperture being arranged wherein the retention means may be introduced into the aperture and the locking pin member twisted to lock the locking pin member in the aperture.

The vehicle may comprise a Bowden cable arrangement operable to rotate the selector shaft from the park mode position to the park release mode position when a pull member of the arrangement is pulled.

In a further aspect of the invention there is provided vehicle park means comprising an electrically actuated selector shaft for selecting an operational mode of the park means, in the absence of electrical power the selector shaft being rotatable between a park position and a park release position in order to release the park means, the park means comprising locking means for locking the selector shaft in the park release position, the locking means being operable to lock the selector shaft in the park release position by manual translation or rotation of one or more members in first and second directions respectively, the first direction being different from the second direction.

In one aspect of the invention there is provided a method of releasing a transmission from a park position by rotation of a selector shaft of the transmission, the method comprising the steps of:
  rotating the selector shaft from the park position to a park release position; and
  locking the selector shaft in the release position by means of locking means,
  whereby the successive steps of rotating the shaft to the release position and subsequently locking the shaft in the release position require translation or rotation of one or more members in first and second directions respectively, the first direction being different from the second direction.

Thus, the step of rotating the shaft to the release position requires translation or rotation of one or more members in the first direction and the step of locking the shaft comprises translation or rotation of one or more members in the second direction which is different from the first direction.

In one aspect of the invention there is provided a method of releasing an immobilising function of a vehicle by rotation of a shaft, the method comprising the steps of:
  rotating the shaft from the immobilising position to a release position; and
  locking the shaft in the release position by means of locking means,
  whereby the successive steps of rotating the shaft to the release position and subsequently locking the shaft in the release position require manual translation or rotation of one or more members in first and second directions respectively, the first direction being different from the second direction.

The immobilising function may for example be a brake such as a parking brake or any other suitable function for immobilising a vehicle to prevent movement thereof such as a park mode of an automatic transmission.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
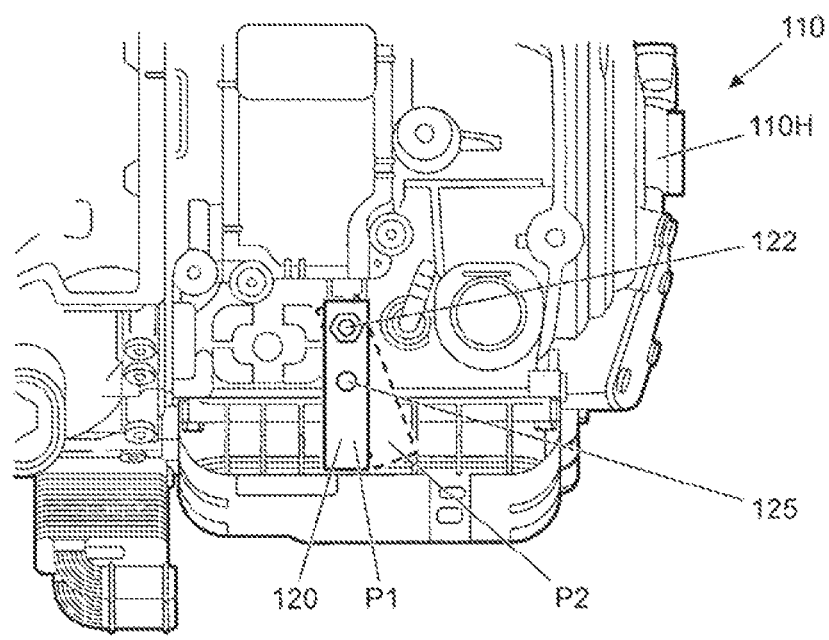
FIG. 1 shows (a) an automatic transmission according to an embodiment of the invention, (b) a release lever of the transmission before locking means is introduced and (c) the release lever after locking means has been introduced to lock the selector shaft in a park release position.
Figure 1:
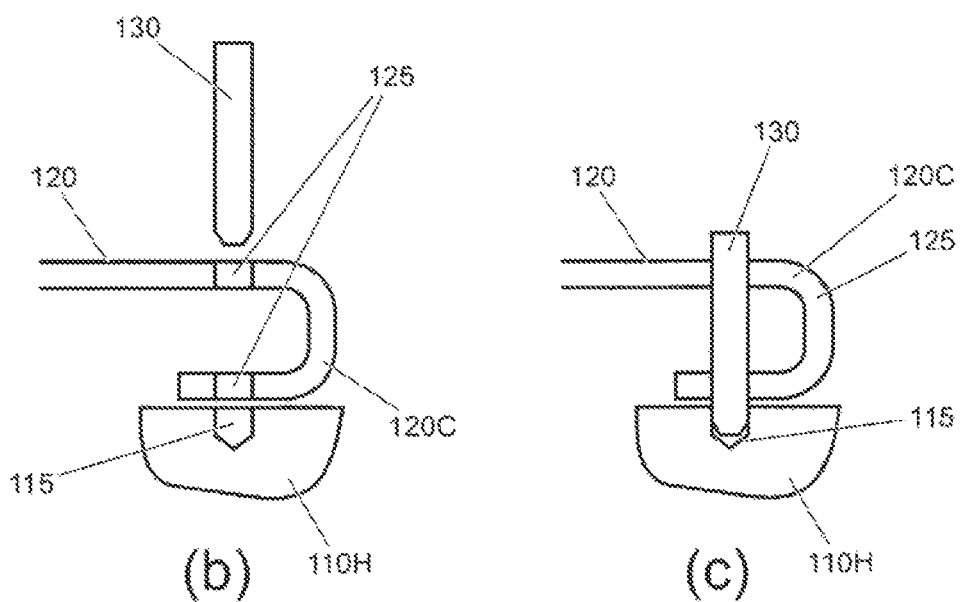

FIG. 1 (*a*) shows an automatic transmission 110 according to an embodiment of the present invention. The transmission has a selector lever or handle 120 operable to rotate a transmission mode selector shaft 122. The selector shaft 122 is operable in use to select a required mode of operation of the transmission responsive to a rotational position of the shaft 122. An actuator (not shown) is employed to rotate the selector shaft 122 in normal use. In some embodiments the actuator may be an electrical actuator.

As shown in FIG. 1(*b*) the selector lever 120 is bent at a free end thereof to form a C-shaped portion 120C. A pair of aligned service pin apertures 125 are formed through the C-shaped portion in upper and lower portions thereof (with respect to the orientation shown in FIG. 1 where the C-shape is substantially upright). The service pin apertures 125 are positioned such that a service pin 130 may be inserted through the apertures 125. It is to be understood that the presence of two spaced apart apertures 125 enable a service pin 130 to be held in a substantially fixed orientation with respect to the lever 120.

The selector lever 120 may be rotated manually by an operative from a park position P1 to a park-released position P2. A spring bias arrangement of the transmission 110 urges the lever 120 to return to the park position P1 when it is displaced therefrom.

When in the park-released position P2 the selector lever aperture 125 aligns with a blind pin-receiver aperture 115 provided in a housing or casing 110H of the transmission 110.

In use, with the selector lever 120 in park-released position P2 a service pin 130 may be inserted through the apertures 125 in the selector lever 120 and the pin-receiver aperture 115 in the housing 110H as shown in FIG. 1(*c*). The selector lever 120 seeks to return to position P1 under the bias of the spring arrangement noted above and urges the service pin 130 against a sidewall of the pin-receiver aperture 115. The selector lever 120 may therefore be held in the park-released position P2.

The feature that the lever 120 is bent into a substantially C-shaped formation has the advantage that a risk that the service pin 130 becomes dislodged from the pin-receiver aperture 115 is reduced. It is to be understood that if the pin receiver aperture is made sufficiently deep a requirement to provide two service pin apertures in the lever 120 in order to hold the service pin 130 in a substantially fixed orientation may be eliminated.

The selector lever 120 may be returned to the park position P1 by removing the service pin 130. In the embodiment of FIG. 1 and in some other embodiments the selector lever 120 has a substantially flat surface to which finger pressure may be applied by a user when moving the lever. The presence of a substantially flat surface improves a user experience when turning the lever, reducing a risk of damage to a user's finger.

Figure 2:
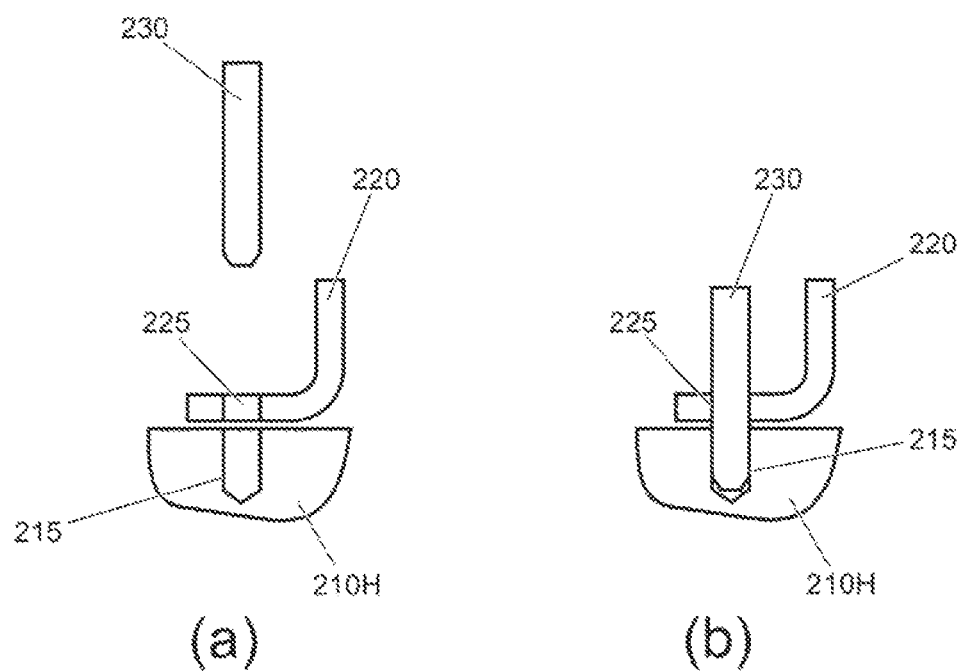
FIG. 2 shows a release lever arrangement according to an alternative embodiment of the invention (a) before locking means is introduced and (b) after locking means has been introduced to lock the selector shaft in a park release position.

FIG. 2 shows a selector lever arrangement according to an alternative embodiment of the invention. Like features of the embodiment of FIG. 2 to those of the embodiment of FIG. 1 are shown with like reference signs prefixed numeral 2 instead of numeral 1.

In the arrangement shown a transmission mode selector lever 220 is provided having a single bend at the free end thereof, forming an L-shaped arrangement, rather than a C-shaped arrangement. A single service pin aperture 225 is provided through the lever 220. A corresponding service pin receiver aperture 215 is provided in the transmission housing 210H.

In the embodiment of FIG. 2 the pin receiver aperture 215 is deeper than that of the embodiment of FIG. 1, being sufficiently deep to allow the service pin 230 to be retained therein without requiring more than one aperture to be formed in the selector lever 220. It is to be understood that not all transmission housings 210H may allow a sufficiently deep pin receiver aperture 215 to be formed therein and therefore the arrangement of FIG. 1 may be preferable in some embodiments.

It is to be understood that the pin receiver aperture 215 is sufficiently deep to allow a service pin 230 to be retained therein by a pinching action of the lever 220 on the pin 230. The pinching action is imposed under the restoring force imposed by a spring bias arrangement of the transmission which urges the lever 230 to return to a park position P1 when it is displaced therefrom as discussed above with respect to the embodiment of FIG. 1.

In some embodiments the service pin 130, 230 may be operable to become locked in the pin receiver aperture 115, 215 so as to prevent accidental release of the pin 130, 230 from the aperture 115, 215. In some embodiments the service pin 130, 230 is shaped so as to enable retention within the aperture. For example in some embodiments the service pin 130, 230 has a substantially T-shaped free end portion. The service pin 130, 230 is arranged to be inserted into the pin receiver aperture 115, 215 and to be rotated once inserted whereupon a crossbar of the T-shaped portion prevents withdrawal of the service pin 130, 230 by interference with a portion of the transmission housing 110H, 210H defining the aperture 115, 215. In some embodiments the service pin 130, 230 is operable to engage the cross-bar with a recess formed within the transmission housing 110H, 210H. Other means for retaining the service pin 130, 230 within the pin receiver aperture 115, 215 are also useful.

Figure 3:
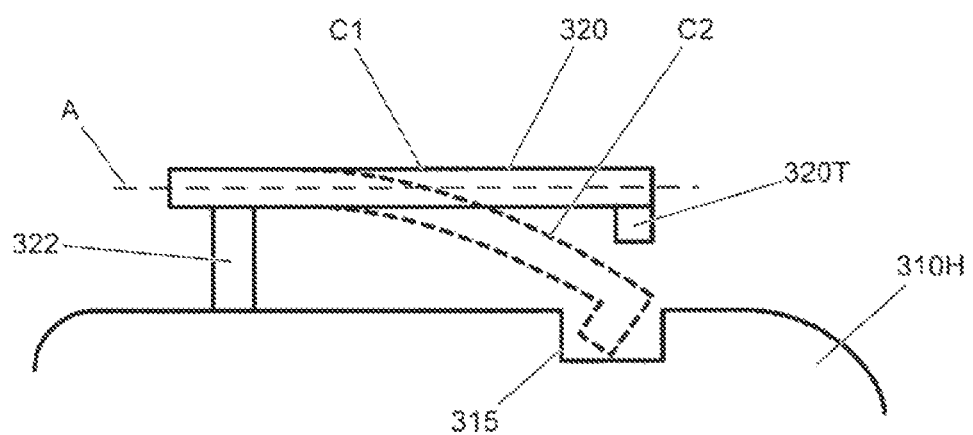
FIG. 3 shows a release lever arrangement according to a further embodiment of the invention.

FIG. 3 shows a selector lever arrangement according to a further embodiment of the invention not requiring use of a service pin. Like features of the embodiment of FIG. 3(*b*) to those of the embodiment of FIG. 1 are shown with like reference signs prefixed numeral 3 instead of numeral 1.

FIG. 3 shows an automatic transmission housing 310H having a recess 315 formed therein. A selector lever 320 is coupled to a transmission selector shaft 322 and is operable to rotate the shaft 322 when the shaft is in a park position to release the transmission from a park mode. The selector lever 320 has a hooked end, at which a portion of the lever 320 is bent towards the transmission housing 310H forming a hooked tip portion 320T.

The selector lever 320 is of a bi-stable construction and is operable to assume one of two configurations. In a first configuration C1 a longitudinal axis A of the lever 320 is substantially straight from the selector shaft 322 to the hooked tip portion 320T.

In a second configuration C2 the longitudinal axis A of the selector lever 320 bends along a length of the lever 320 towards the housing 310H such that the hooked tip portion 320T may protrude into a recess 315 formed in the housing 310H. The recess is formed in the housing 310H at a location corresponding to the park-released position of the lever 320. Thus in use with the selector lever 320 in the first configuration C1 the lever 320 may be rotated to the park-released position and the lever 320 bent into the second configuration C2 such that the hooked tip portion 320T protrudes into the recess 315. Rotation of the lever 320 back to the park position is prevented by abutment of the hooked tip portion 320T with a sidewall of the recess 315 until the lever 320 is returned to the first configuration C1.

In some embodiments the selector lever 320 is formed from a bi-stable metallic strip arrangement.

Figure 4:
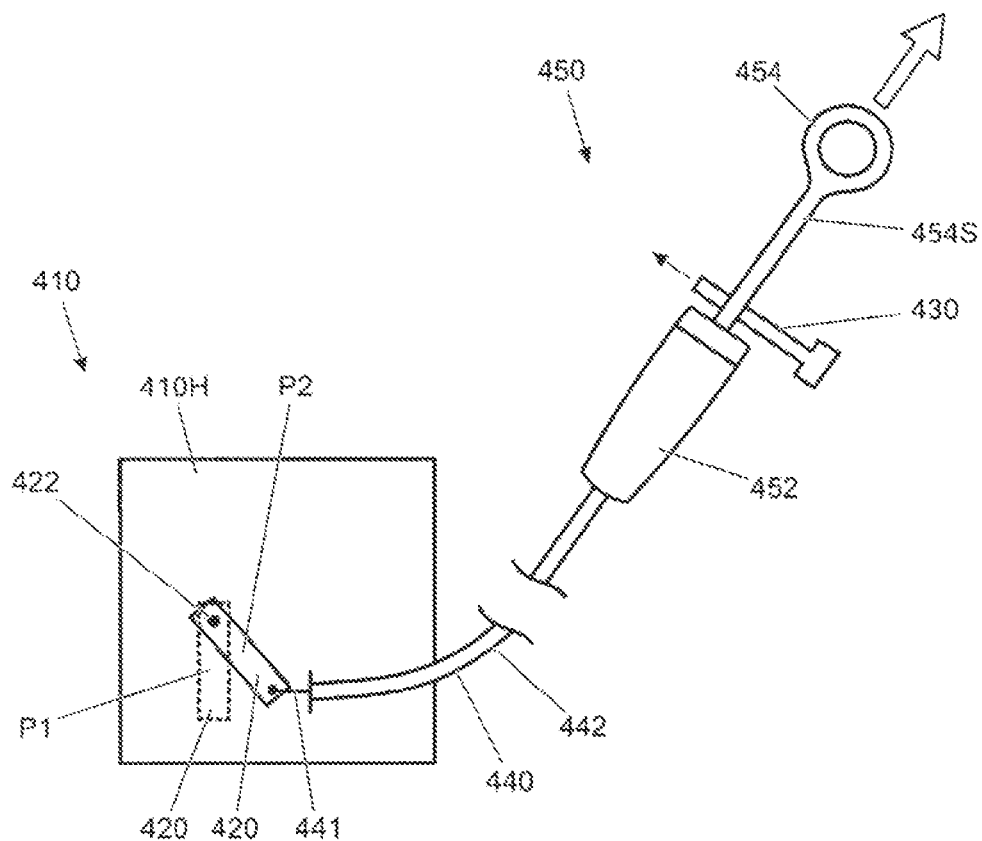
FIG. 4 shows a transmission release arrangement according to a still further embodiment of the invention.

FIG. 4 shows a selector lever arrangement according to an alternative embodiment of the invention. Like features of the embodiment of FIG. 4 to those of the embodiment of FIG. 1 are shown with like reference signs prefixed numeral 4 instead of numeral 1.

In the embodiment of FIG. 4 a transmission selector shaft 422 of an automatic transmission 410 is rotatable from a park position to a park-released position by rotation of a selector lever 420 from a park position P1 to a park-released position P2 in a similar manner to the embodiments described above. The selector lever 420 is coupled to an inner cable 441 of a Bowden cable 440. An opposite end of the inner cable 441 is connected to a ring-pull member 454 of a ring-pull actuator arrangement 450.

The ring-pull member 454 is slidable in a barrel member 452 of the actuator arrangement 450. The barrel member 452 is coupled to an outer sheath 442 of the Bowden cable 440. The Bowden cable 440 is arranged wherein the transmission selector lever 420 may be rotated from the park position P1 to the park-released position P2 by pulling the ring-pull member 454 away from the barrel member 452. Once the selector lever 420 has assumed the park-released position P2 a service pin 430 is inserted through an aperture in a stem 454S of the ring-pull member 454 to prevent the ring-pull member 454 from moving back towards the barrel member 452. It is to be understood that a spring bias arrangement of the automatic transmission 410 biases the selector lever 420 to the park position P1 such that if the service pin 430 is removed the selector lever 420 rotates to the park position P1 drawing the stem 454S of the ring-pull member 454 back into the barrel member 452. In some embodiments further biasing means is provided to urge the selector lever 420 to the park position P1 in order to compensate for any frictional forces imposed by the Bowden cable 440 on movement of the lever 420.

It is to be understood that the ring-pull actuator arrangement 450 may be mounted in any suitable location allowing ready access by an operative. For example the ring-pull actuator arrangement 450 may be mounted in a cabin of a vehicle. Alternatively the ring-pull actuator arrangement 450 may be mounted in an engine bay or any other suitable location. It is to be understood that the embodiment of FIG. 4 may be particularly useful in vehicles where access to a selector lever 420 mounted on the selector shaft 422 is difficult. This may be the case in particular with longitudinally mounted ('north-south' orientated) engine and transmission assemblies.

In some embodiments, the ring-pull member 454 may be locked in a position in which the selector lever 420 has assumed the park-released position P2 by rotation of the ring-pull member 454. Rotation to lock the ring-pull member 454 may for example be rotation about an axis of the ring-pull member 454 along which the ring-pull member 454 is pulled in order to rotate the selector lever 420. Other arrangements are also useful.

Figure 5:
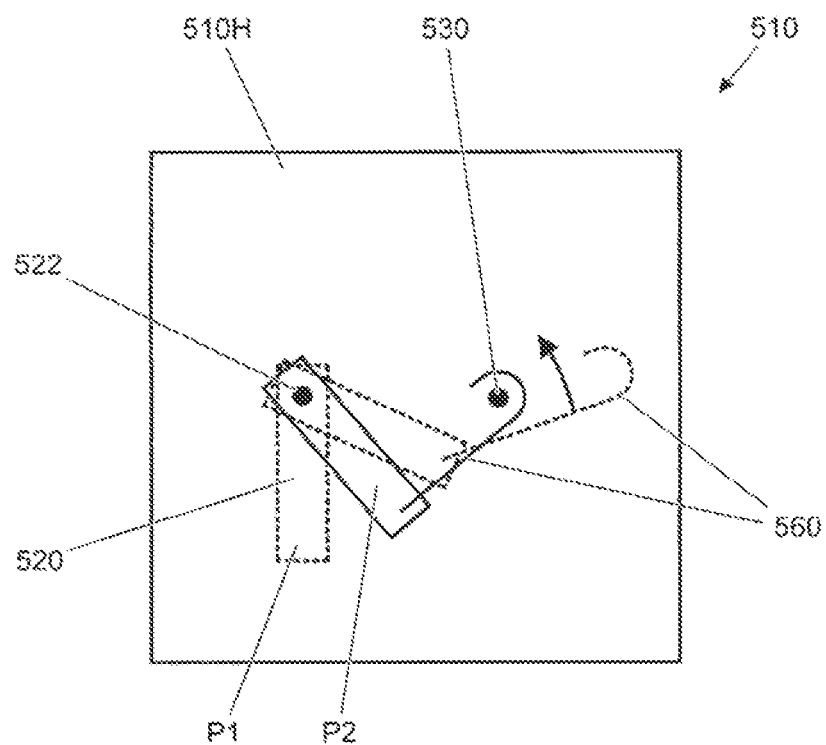
FIG. 5 shows a transmission release arrangement according to an embodiment of the invention.

FIG. 5 shows an automatic transmission 510 according to a further embodiment of the invention. Like features of the embodiment of FIG. 5 to the embodiment of FIG. 1 are provided with like reference signs prefixed numeral 5 instead of numeral 1.

A park release lever 520 of the transmission 510 is operable between a park position P1 in which the transmission assumes a park mode and a park-release position P2 in which the transmission is released from the park mode in a similar manner to the transmission 110 of the embodiment of FIG. 1. A hook member 560 is shown coupled to the release lever 520. In the embodiment shown the hook member 560 is permanently coupled to the release lever 520 although in some embodiments the hook member 560 may be coupled to the lever 520 only when it is required to lock the release lever 520 in the park-release position P2.

In order to lock the release lever 520 in the park-release position, the lever is swung from the park position P1 to the park-release position P2 and the hook member 560 is hooked around a pin element 530 protruding from a housing 510H of the transmission 510. The hook member 560 thereby maintains the release lever 520 in the park-release position P2.

In some embodiments the pin element 530 is permanently attached to the transmission housing 510H whilst in some alternative embodiments the pin element 530 is fixedly attached thereto. In some embodiments the pin element 530 is releasably attachable to the housing 510H when required.

When it is required to release the transmission from the park-release position P2 the hook member 560 is unhooked from the pin element 530 and allowed to return to the park position P1 under the bias of a spring bias arrangement of the transmission 510. The hook member 560 may be arranged to be held clear of a normal range of movement of the lever 520 when the hook member 560 is not in use.

In some embodiments the hook member 560 is arranged to be coupled to the release lever 520 and the transmission housing 510H only when it is required to hold the release lever 520 in the park release position P2. Thus the hook member 560 may be provided in the form of an accessory separate from the transmission 510.

In some embodiments the hook member 560 is permanently coupled to the transmission housing 510H and is hooked to the release lever 520 when required.

Embodiments of the invention have the advantage that a park mode of a transmission may be released by means of a park release lever in a relatively straightforward manner and locked in the release position. If the vehicle begins to move unexpectedly once the park mode is released the park mode may be resumed by releasing the park release lever before it is locked in the release position.

Because one or more members must be moved in different respective directions in order to rotate the selector shaft and lock the selector shaft in the brake release position, a risk that an operative rotates the selector shaft and locks the selector shaft in a single action is reduced.

Whilst embodiments of the invention have been described with respect to a park release function of an automatic transmission it is to be understood that embodiments of the invention may be employed in other transmissions having brake means functionality as well as electrically-actuated park brake (EPB) systems in which actuation of a parking brake is controlled by means of an electrical actuator.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A transmission comprising:
   a power actuated park means operable to lock one or more wheels of a vehicle in a substantially stationary condition, the park means comprising a power actuated selector shaft for selecting an operational mode of the park means, the selector shaft being rotatable between a park mode position in which the one or more wheels are locked by the park means and a park release mode position in which the one or more wheels are released by the park means;
   wherein the selector shaft may be locked in the release mode position by insertion of a locking pin member into an aperture; and
   a handle directly coupled to the selector shaft, the handle being a separate component from the locking pin member and manually operable by direct hand force to rotate the shaft to the release mode position by rotation thereof,
   the park means being operable whereby, in the absence of power, the selector shaft may be successively rotated to the park release mode position and locked by the locking pin member in the park release mode position.

2. A transmission as claimed in claim 1 wherein the handle member is operable to be locked in the park release mode position by insertion of the locking pin member into the aperture, and wherein the aperture is formed in a portion of the handle member.

3. A transmission as claimed in claim 1 whereby the park means is operable whereby the selector shaft may be rotated to the park release mode position and locked by the locking means in the park release mode position by manual translation or rotation of the handle in a first direction and manual translation or rotation of the locking pin member in a second direction in the absence of power, the first direction being different from the second direction.

4. A transmission as claimed in claim 3 operable to release the park means and lock the selector shaft in the release mode position by manual translation or rotation of the handle and manual translation or rotation of the locking pin member in substantially orthogonal first and second directions respectively.

5. A vehicle comprising a transmission as claimed in claim 1.

* * * * *